Oct. 9, 1923.
E. E. MELLENTHIN
1,469,802
GOVERNOR FOR ELECTRIC MOTOR DRIVES
Filed June 9, 1921
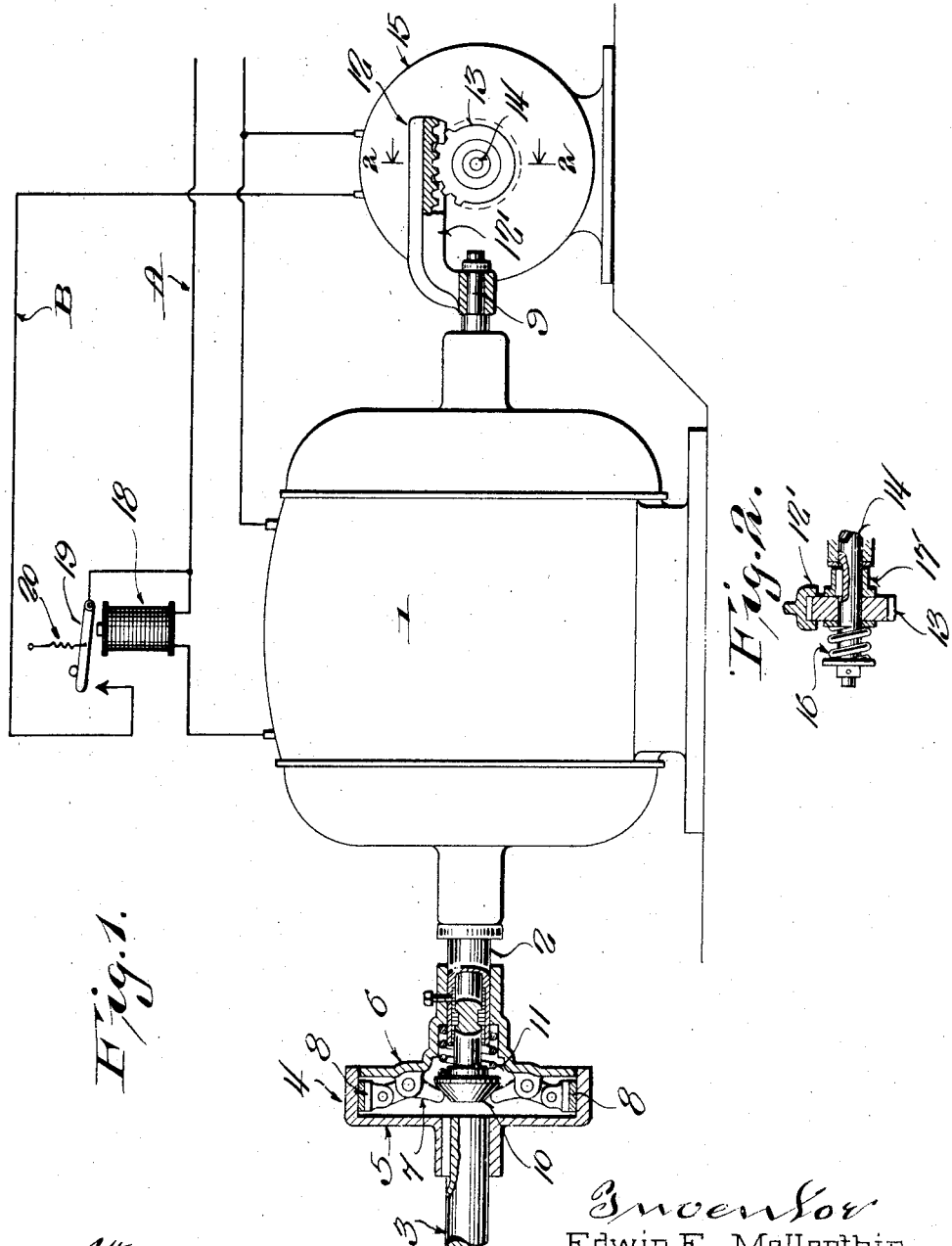
Inventor
Edwin E. Mellenthin Patented Oct. 9, 1923.

1,469,802

UNITED STATES PATENT OFFICE.

EDWIN E. MELLENTHIN, OF WAUKESHA, WISCONSIN.

GOVERNOR FOR ELECTRIC MOTOR DRIVES.

Application filed June 9, 1921. Serial No. 476,222.

*To all whom it may concern:*

Be it known that I, EDWIN E. MELLENTHIN, a citizen of the United States, and resident of Waukesha, in the county of Waukesha and State of Wisconsin, have invented certain new and useful Improvements in Governors for Electric Motor Drives; and I do hereby declare that the following is a full, clear, and exact description thereof.

This invention pertains to means for automatically preventing overload upon an electric motor and consequent burning out of the same.

The general object of the invention resides in the provision of a simple, positive and efficient device of this character which, at a predetermined point, will release the load from the motor.

A further object incidental to the foregoing is to provide a device of this character adapted to be actuated by the increased amperage, of the motor supply current, resulting from overload upon the motor, thereby insuring instantaneous release of the load.

With the foregoing and other objects in view which will be apparent as the description proceeds, my invention consists in what is herein shown and described and more particularly pointed out and defined by the appended claims.

In the drawings:—

Figure 1 is an elevational view of an arrangement embodying the invention, and

Figure 2 is a detailed sectional view taken on the line 2—2 of Figure 1.

Referring now more particularly to the accompanying drawings:—

Numeral 1 designates a driving motor provided with a hollow armature shaft 2. A driven shaft 3 is aligned with the armature shaft 2 and connected thereto by means of a clutch 4 comprising, a housing 5 keyed or otherwise suitably secured to the driven shaft 3 and a plate 6, the hub of which is mounted upon and fast to shaft 2. Pivoted to the plate 6 are a plurality of clutch levers 7 having gripping plates 8 provided at their outer ends and adapted to engage the housing 5 to lock shafts 2 and 3. A clutch operating rod 9 is slidably mounted within the armature shaft 2 and extends therethrough and is provided at one of its ends with a conical wedge 10 adapted to engage the tails of the clutch levers 7 to force the gripping plates 8 into engagement with the housing 5. A coil spring 11 is disposed between the conical wedge 10, and hub of the plate 6 to normally urge the wedge into its operative position for locking the clutch.

The opposite end of the rod 9 has loosely mounted thereon a rack 12 provided with internal teeth formed between the side extensions 12'. Adapted to engage the rack is a gear 13 loosely mounted on the armature shaft 14 of an auxiliary motor 15. Secured to the shaft 14, adjacent one side of the gear 13 is a friction plate 17. Mounted on the shaft 14 at the opposite side of the gear is an expansive spring 16 which urges the gear 13 into frictional engagement with the plate 15.

When the motor 15 is energized the gear 13, because of its frictional connection with the shaft 14, will actuate the rod 12, to withdraw the conical wedge 10 from engagement with the clutch levers 7 thereby releasing the armature shaft 2 from the shaft 3. When the rod 9 reaches the limit of its releasing movement the force of the motor 15 overcomes the frictional engagement between the gear 13 and plate 17 and is permitted to continue rotation because of the slippage which then takes place. As soon as the motor 15 is de-energized and comes to rest, the spring 11 will again force the conical wedge into operative position to lock the clutch.

For the purpose of driving the motor 1, a main circuit A is provided which connects with a suitable source of current supply. Disposed within the circuit A is an electric magnet 18 for the purpose of closing a switch 19 in an auxiliary circuit B connected to the main circuit A for driving the auxiliary motor 15. In operation the normal driving current passing thru the circuit A is insufficient to energize the coil 18 sufficiently to overcome the spring 20 which normally holds the switch 19 open. When the driving motor 1 is overloaded the increased amperage resulting in the main circuit will increase the attraction in the coil 18 and cause the switch 19 to be closed which in turn energizes the motor 15 causing the clutch 4 to be released and consequently relieving the load from the motor. As soon as this occurs the amperage in the main circuit A is again reduced to normal releasing the switch 19 and de-energizing the motor 15.

In the foregoing it is obvious that a very simple, positive and efficient device has been provided which will instantaneously release the motor from the load at a predetermined point and thereby prevent damage resulting from burning out.

I claim:—

1. In combination a driven shaft, an electric driving motor, provided with a current supply circuit, a clutch disposed between said driven shaft and said driving motor, electro-magnetic means for releasing said clutch, and means actuated by the supply current to connect the electro-magnetic means with the supply circuit upon a predetermined load upon the driving motor.

2. In combination a driven shaft, an electric driving motor, provided with a current supply circuit, a clutch disposed between said driven shaft and driving motor, an auxiliary motor for releasing said clutch, and means actuated by the supply current to connect the auxiliary motor with the supply circuit at a predetermined load upon the driving motor.

In testimony that I claim the foregoing I have hereunto set my hand at Milwaukee, in the county of Milwaukee and State of Wisconsin.

EDWIN E. MELLENTHIN.